Oct. 2, 1956     T. D. WILLIAMSON, JR     2,765,182
INSULATED SEALING APPARATUS FOR CONCENTRIC CONDUITS
Filed June 14, 1952     2 Sheets-Sheet 2
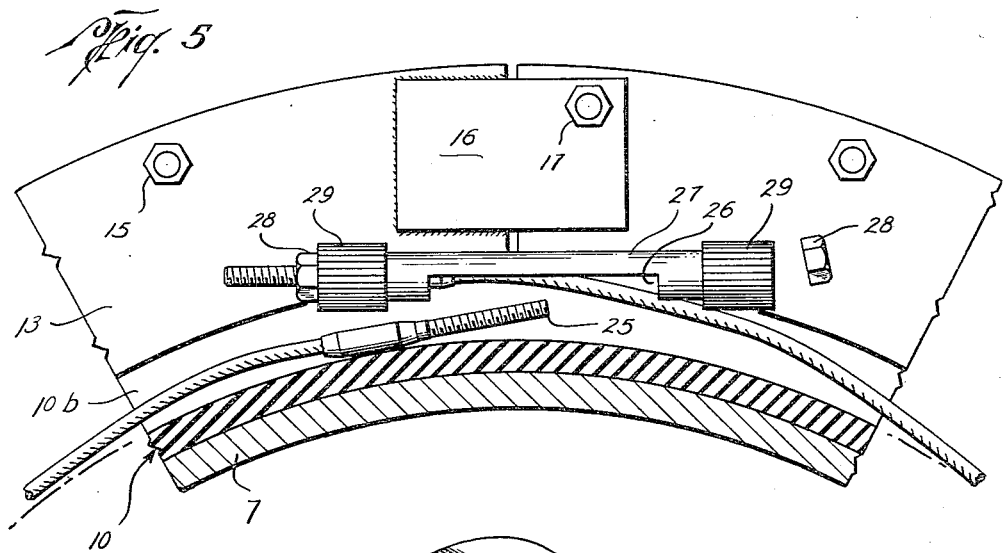
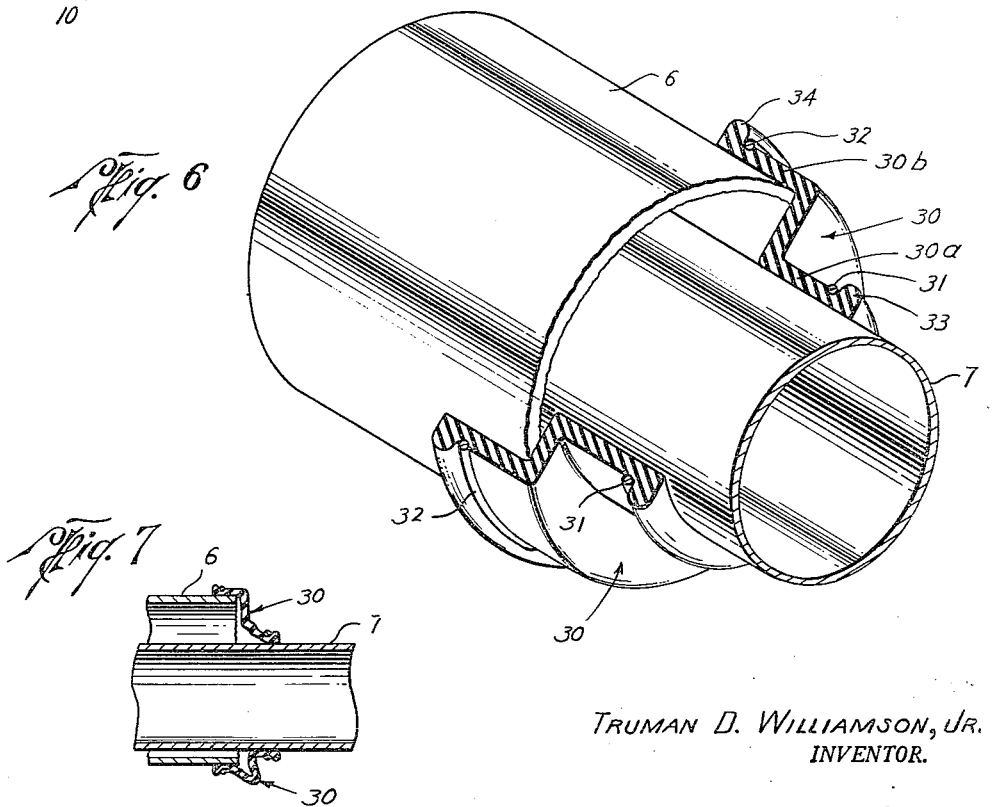
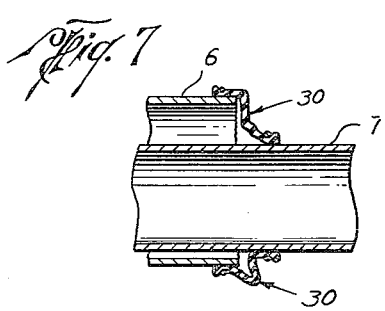
TRUMAN D. WILLIAMSON, JR.
INVENTOR.
BY
Browning & Simms
ATTORNEYS.

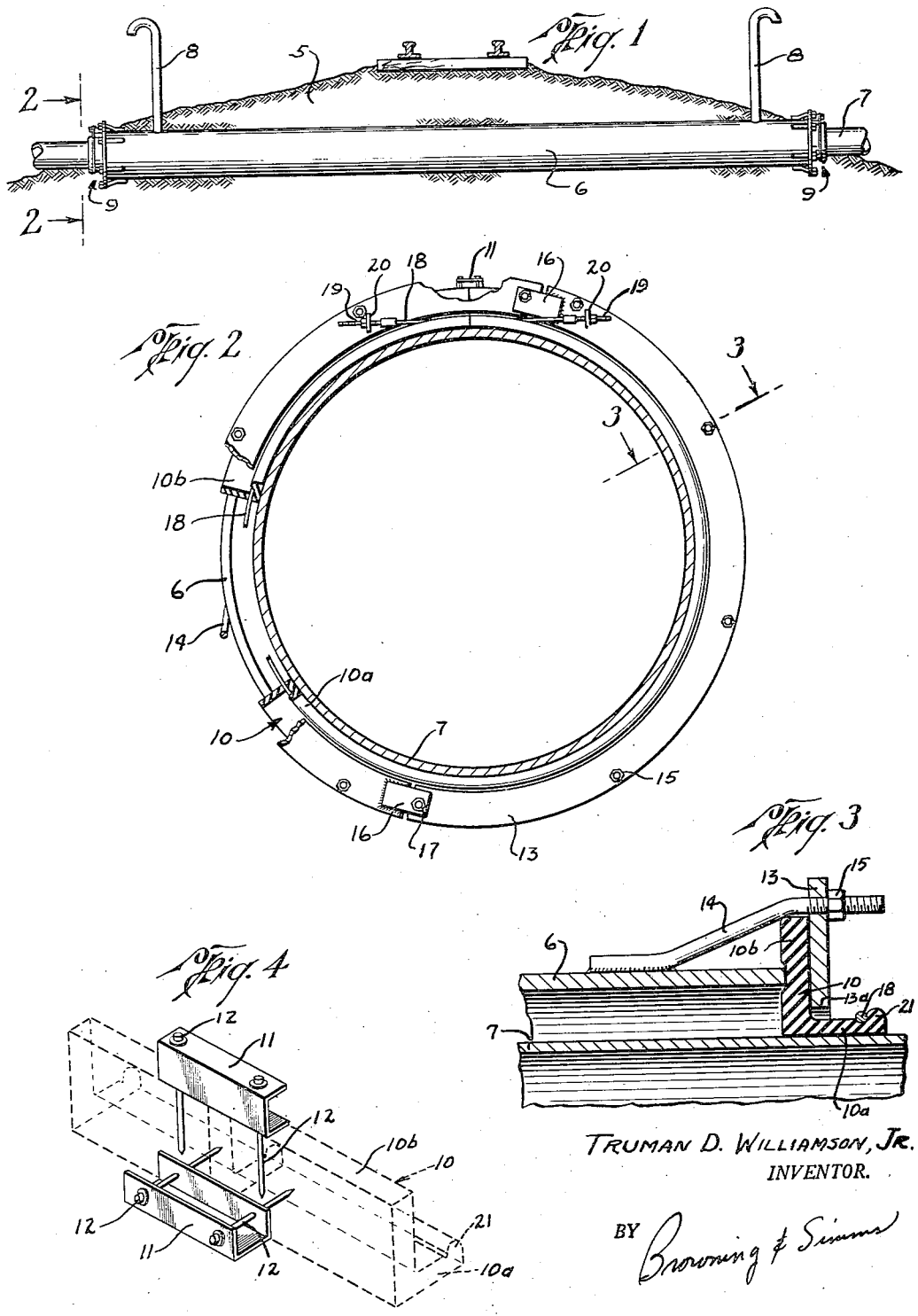

United States Patent Office 2,765,182
Patented Oct. 2, 1956

2,765,182

INSULATED SEALING APPARATUS FOR CONCENTRIC CONDUITS

Truman D. Williamson, Jr., Tulsa, Okla.

Application June 14, 1952, Serial No. 293,509

2 Claims. (Cl. 285—54)

This invention relates to a sealing apparatus and more particularly to an apparatus for effecting a seal between the end of an outer conduit and the peripheral surface of an inner conduit extending thereinto.

In some instances, it is desirable to effect a seal between the end of an outer or casing conduit and an inner conduit extending thereinto. For example, pipe lines for natural gas, petroleum products and other substances are ordinarily passed under a road bed, railway embankment or other public thoroughfare surrounded by a larger outer conduit or casing. The ends of this casing are often required to be sealed with the outer surface of the pipe line passing therethrough to exclude water and thereby lessen corrosion. Also, in many instances, pipes are passed through conductor conduits or casings embedded in concrete walls or the like, as in piping passing to and from cellars, pump pits and pipe trenches. There, too, a seal between such pipe and the conductor conduit is desirable to exclude water, trash and various foreign materials from the annulus between the pipe and conductor conduit.

While sealing apparatus has been heretofore provided for effecting a seal between an outer conduit casing and the peripheral surface of an inner conduit, such apparatus to effect its most efficient seal has not only required substantially coaxial alignment of the casing and inner conduit but also that both be of a substantially perfect circular configuration. Obviously such alignment and cross-sectional configuration are not always of easy provision in the field and it would be highly advantageous to possess a sealing apparatus which can effect a satisfactory seal with substantial misalignment of the two conduits and even when there is, in addition, substantial out-of-roundness of either or both such conduits. It would also be advantageous to possess a sealing apparatus which not only effected a satisfactory seal under such conditions but also where the end of the casing is rough cut and uneven as frequently occurs when a cutting torch is employed to cut the casing to proper length.

It is therefore an object of this invention to provide an apparatus adapted to effect a seal between the end of an outer conduit casing and an inner conduit extending thereinto even though such conduits be substantially out of axial alignment and out-of-round.

Another object is to provide apparatus for effecting such a seal even where the end of the outer conduit is roughly, unevenly or not squarely cut.

Another object of this invention is to provide such a sealing apparatus wherein there is no metal-to-metal contact between the outer conduit and the inner conduit.

Another object of this invention is to provide such a sealing apparatus wherein there can be substantial movement of one conduit with respect to the other without causing any rubbing together of parts and without breaking the seal.

Another object of this invention is to provide a sealing apparatus wherein a resilient gasket has one portion sealingly pressed against an outer conduit and another portion sealingly pressed against the peripheral surface of an inner conduit with an intermediate portion being provided therebetween to flex and accommodate movement of the two conduits with respect to each other.

Another object of this invention is to provide a sealing apparatus wherein one leg of an L-shaped resilient gasket is sealingly pressed against the end of an outer conduit and the other leg of the gasket is pressed against the peripheral surface of an inner conduit, the pressing means for said legs acting independently from one another to perform their function.

Another object of this invention is to provide a sealing apparatus wherein one leg of an annular gasket of L-shaped radial cross-section is pressed against the end of an outer conduit by a flange and the other gasket leg is pressed against the peripheral surface of an inner conduit by a ring, the inner periphery of said flange providing a clearance with any structure inwardly thereof whereby lateral movement of said inner conduit with respect to said outer conduit is permitted.

Another object of this invention is to provide a sealing apparatus including an annular resilient gasket having internal sealing surfaces arranged to have different diameters and connected by a flexible web, there also being provided means for sealingly pressing each of the sealing surfaces to the outer peripheries of telescoped conduits to seal the annular space therebetween.

Another object of this invention is to provide a sealing apparatus for sealing between an outer casing conduit and an inner conduit extending thereinto including an annular resilient gasket generally Z-shaped in radial cross-section and providing radially and axially offset legs having internal sealing surfaces, the legs being connected by a resilient web being sealingly pressed against the peripheral surface of said outer and inner conduits, respectively, by a pressing means whereby the annular space between the conduits is effectively sealed even though the conduits be out-of-round and not exactly coaxial with each other and even though the end of the outer conduit be rough, uneven and not squarely cut in a diametrical plane.

Other objects, advantages and features of this invention will be apparent from a consideration of the written specification, the claims and the drawings wherein:

Fig. 1 illustrates a pipe line crossing through a railroad embankment and shows the sealing apparatus in one of its uses;

Fig. 2 is an end view, partially in section, taken on the line 2—2 of Fig. 1;

Fig. 3 is a radial cross-sectional view on the line 3—3 of Fig. 2;

Fig. 4 is a perspective, partially in phantom, showing cleats for joining together the ends of the resilient gasket of this invention;

Fig. 5 is a view similar to the upper portion of Fig. 2 but illustrating a more preferred means for fastening the ends of the cable pressing means together;

Fig. 6 is a view illustrating another embodiment of this invention; and

Fig. 7 illustrates the effect of lack of concentricity between an outer and an inner conduit upon the embodiment of Fig. 6.

Like characters of reference are used throughout the several views to designate like parts.

Referring to Fig. 1, there is shown a railroad embankment 5 having an outer or conductor conduit 6 extending through it. The pipe line or inner conduit 7 is passed through the outer conduit, the latter being substantially larger in diameter to permit the inner conduit to be passed freely therethrough. Suitable insulated supports (not shown) can be placed about the inner conduit within conduit 6 to center it therein. Also vent pipes 8 can communicate with the outer conduit to prevent pressure accumulaitons therein. The sealing apparatus of this invention is designated generally by the numeral 9 in Fig. 1 and is adapted to form a seal across the annular space between the outer conduit 6 and the peripheral surface of inner conduit 7 in such a manner that the latter need not be in substantial axial alignment with outer conduit 6 and further in a manner that both conduits can be substantially out-of-round without preventing a seal. Also, the sealing apparatus avoids an electrical conducting connection between the two conduits.

Referring now to Figs. 2 to 4, an annular resilient gasket 10, which can be L-shaped in radial cross-section, is provided to surround inner conduit 7 with one leg 10a lying parallel to and against the peripheral surface of conduit 7 and with another leg 10b extending to be in abutment with the end of outer conduit 6. It will be seen that there is provided an annular resilient gasket having a portion lying against the inner conduit and another portion abutting the end of the outer conduit.

The gasket is made of a resilient material such as rubber or the like, not only so that it can be compressed against the conduits to readily form a seal, but also to permit limited movement of one conduit with respect to the other and to compensate for misalignment or out-of-roundness of the conduits. The gasket can be cut and formed with abutting ends to facilitate placement around the inner conduit. To join these ends together, there is provided U-shaped brackets 11 to extend across the joint with nails 12 passing through opposing legs of the bracket into the gasket. In this manner, the nails are prevented from being pulled sideways in the gasket and brackets when force is applied to separate apart the ends of the gasket. The brackets are preferably two in number and are situated so that the nails extend into both of the legs of the L-shaped gasket.

To press the leg 10b of gasket 10 into abutment with the end of conduit 6 to form a seal therewith, an annular flange or plate 13 is disposed on the side of leg 10b opposite the end of the pipe. This flange can be pulled towards and carried by the outer conduit by a suitable means such as bolts 14 attached to conduit 6 and having a nut 15 on a threaded portion to take up on flange 13. Flange 13 can be made as two or more pieces detachably joined together by cleats 16 and bolts 17 to facilitate placement of the flange.

It is to be noted that the inner circumference 13a of the flange is removed or spaced a substantial distance from inwardly adjacent structure, such as conduit 7 and leg 10a, so as to permit substantial axial misalignment of the two conduits and to be placeable around the inner conduit even though such conduit be out-of-round. Also, such spacing permits limited lateral movement of the inner conduit independently of the outer one. When leg 10a extends beneath flange 13, the two conduits cannot move together to form an electrical connection therebetween.

Means are provided for pressing leg 10a against the inner conduit to form a seal therewith. This means comprises a ring in the form of a flexible cable 18 which can be drawn tightly against the gasket by take-up studs 19 on each of its ends which pass through brackets 20 carried by the flange. The flexibility of cable 18 permits a tight seal between the resilient gasket and the inner conduit even though the latter is wrinkled, dished, out-of-round, or has other surface irregularities. To facilitate the placement of cable 18 and to help hold it in proper position, a lip 21 can be formed on the extremity of leg 10a.

While the embodiment of the sealing apparatus of this invention described above in detail has been found to be satisfactory in many field installations, a more preferred means for fastening the ends of cable 18 together is illustrated in Fig. 5. With this structure, the ends of the cable have threaded terminals 25 attached thereto as by swaging so that they can be passed through cut-out portion 26 of tubular connector 27. Nuts 28 can then be employed to draw cable 18 tightly around leg 10a as described above. It is preferred to provide tubular connector 27 with suitable electrical insulation to prevent it from accidentally electrically contacting flange 13. Such insulation can comprise rubber sleeves 29 fastened to the ends of connector 27 as shown. Then should cable 18 cut through gasket 10 or otherwise become in contact with conduit 7, there will be no possibility of the cable also grounding to flange 13 and hence to conduit 6.

The means for fastening the cable ends as illustrated in Fig. 5 is entirely independent of flange 13 so that conduit 7 can move with respect to conduit 6 without altering the tension on the cable. For example, if the cable of the seal assembly illustrated in Fig. 2 be drawn exceedingly tightly around the gasket and if, under such conditions, conduit 7 should move downwardly to further tighten the cable, the latter may cut through the gasket thereby grounding the two conduits together. Such is not possible for the structure of Fig. 5.

The use and operation of the sealing apparatus is believed to be apparent from the foregoing. However, a brief description thereof will be given to insure an adequate disclosure.

After inner conduit 7 has been positioned within outer conduit 6, gasket 10 can be placed around the inner conduit and its ends joined by brackets 11 as illustrated in Fig. 4. Flange 13 is then positioned against leg 10b of the gasket after its segments have been bolted together by clips 16 and bolts 17. Then by tightening nuts 15 on bolts 14, which have been welded or otherwise attached to surface of outer conduit 6, the gasket can be pressed against the end of the outer conduit to form a seal. Cable 18 is then passed around the leg 10a of the gasket and drawn tight by taking up nuts 19 against brackets 20 for the embodiment of Fig. 2. For the Fig. 5 embodiment, the cable ends are passed through connector 27 and then nuts 28 are taken up against the ends of the connector. The seal is then complete between the inner and outer conduits.

With the embodiment of Figs. 2 to 4, it is necessary that the end of conduit 6 be sufficiently smooth to permit flange 13 to draw gasket 10 thereagainst and effect a seal. Also, the end of this conduit should lie substantially in a single plane so that flange 13 can snug the gasket against such end. With the embodiment of Figs. 6 and 7, the end of conduit 6 need be neither smooth nor planar and yet there can be secured an effective seal between the two conduits. In this embodiment, an annular resilient gasket 30, which is substantially Z-shaped in radial cross section, has a leg 30a adapted to be sealingly pressed against the periphery of conduit 6 by a cable 31 which can be arranged substantially in the same manner as cable 18 in Fig. 5. Another leg 30b is radially and laterally offset from leg 30a so that it can be sealingly pressed against the periphery of conduit 6 by a suitable means such as cable 32. The latter is arranged similarly to cable 31. Legs 30a and 30b are provided at their extremities with radially outwardly extending lips 33 and 34 to prevent cables 31 and 32 from rolling off the legs and contacting the conduits.

It will thus be seen that gasket 30 provides longitudinally and radially offset internal sealing surfaces carried by legs 30a and 30b adapted to be pressed into sealing engagement with an outer conduit and an inner conduit extending thereinto. The portions of the gasket carrying the two sealing surfaces are connected by a resilient web permitting the two conduits to move with respect to each other and permitting flexible positioning of the sealing surfaces on out-of-round conduit and on conduits not concentrically disposed. The effects of lack of concentricity and out-of-roundness are illustrated in Fig. 7.

The installation and operation of the sealing apparatus of Fig. 6 is believed fully apparent from the foregoing. All that is necessary is that gasket 30 be positioned around conduits 6 and 7 as illustrated. Then upon installing and tightening cables 31 and 32, legs 30a and 30b will perfect their seal with the respective conduits. Each conduit can then move laterally toward or away from the other without destroying the seal and without altering the tension of cables 31 and 32.

The gasket 30 can be cut at one point in its periphery to facilitate its placement around the conduits. The ends of the gasket can be joined together by any suitable means and an arrangement similar to that of Fig. 4 has been found satisfactory.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for effecting a seal between an end of an outer conduit and the outer periphery of an inner conduit extending into the outer conduit which comprises, in combination, an annular gasket of resilient waterproof electrical insulating material having an L-shaped radial cross-section, the gasket being disposed with one side of one leg abutting said end of the outer conduit and the other leg lying against the outer periphery of said inner conduit and providing a seal therebetween, said leg abutting the outer conduit having an outer diameter greater than the outer diameter of the outer conduit, said leg of the gasket lying against the inner conduit extending outwardly of said end of the outer conduit, means to maintain the free end portion of said other leg of the gasket in sealing engagement with said inner conduit, an annular flange disposed on the side of said one leg opposite said outer conduit and surrounding and overlying the leg of the gasket lying against the inner conduit whereby the gasket prevents direct contact between the flange and inner conduit, said flange having an inner diameter less than the inner diameter of the outer conduit but greater than the outer diameter of the gasket leg lying against the inner conduit, the outer diameter of said flange being greater than the outer diameter of the outer conduit, whereby an annular space between the flange and leg of the gasket lying against the inner conduit is provided to permit axial misalignment of the two conduits and said relationship of the inner and outer diameter of the flange to the outer conduit and said relationship of the outer diameter of the leg of the gasket between the flange and outer conduit to the outer conduit permitting sealing with an out-of-round outer conduit, and means secured to and extending between the outer periphery of the outer conduit and the flange and securing the flange to the outer conduit with the leg of the gasket therebetween under compression to provide a seal.

2. The apparatus of claim 1 wherein the outer diameter of the flange is greater than the outer diameter of said one leg of the gasket and the securing means is secured to and extends between the outer periphery of the outer conduit and the portion of the flange radially outward of the gasket.

References Cited in the file of this patent

UNITED STATES PATENTS

| | | |
|---|---|---|
| 901,339 | Grant | Oct. 20, 1908 |
| 937,766 | Christman | Oct. 26, 1909 |
| 993,507 | Collins | May 30, 1911 |
| 1,923,124 | Stanley | Aug. 22, 1933 |
| 1,971,438 | Yoder | Aug. 28, 1934 |
| 2,349,809 | Black | May 30, 1944 |
| 2,653,834 | Purkhiser | Sept. 29, 1953 |

FOREIGN PATENTS

| | | |
|---|---|---|
| 3,834 | Great Britain | Feb. 23, 1905 |